US006679519B2

(12) United States Patent
Müller (10) Patent No.: US 6,679,519 B2
(45) Date of Patent: Jan. 20, 2004

(54) AIRBAG CONFIGURATION AND METHOD FOR OPERATING AN AIRBAG CONFIGURATION

(75) Inventor: Olaf Müller, Rüsselsheim (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/360,455

(22) Filed: Feb. 6, 2003

(65) Prior Publication Data

US 2003/0116944 A1 Jun. 26, 2003

Related U.S. Application Data

(63) Continuation of application No. PCT/EP01/11085, filed on Sep. 25, 2001.

(30) Foreign Application Priority Data

Sep. 25, 2000 (DE) .......................................... 200 16 554

(51) Int. Cl.$^7$ .............................................. B60R 21/16
(52) U.S. Cl. ................................... 280/728.3; 280/732
(58) Field of Search ........................... 280/728.1, 728.2, 280/728.3, 732, 742

(56) References Cited

U.S. PATENT DOCUMENTS

| | | | | | |
|---|---|---|---|---|---|
| 5,344,184 | A | * | 9/1994 | Keeler et al. | 280/730.1 |
| 5,523,854 | A | * | 6/1996 | Hornsby | 358/407 |
| 5,899,488 | A | * | 5/1999 | Muller | 280/728.3 |
| 6,082,817 | A | * | 7/2000 | Muller | 297/216.12 |
| 6,299,203 | B1 | * | 10/2001 | Muller | 280/736 |
| 6,315,321 | B1 | * | 11/2001 | Lutz | 280/728.3 |
| 6,349,963 | B1 | * | 2/2002 | Muller | 280/728.3 |
| 6,357,785 | B1 | * | 3/2002 | Heilig | 280/728.2 |
| 6,527,295 | B2 | * | 3/2003 | Muller | 280/728.3 |
| 6,581,959 | B2 | * | 6/2003 | Müller | 280/728.3 |

FOREIGN PATENT DOCUMENTS

| | | |
|---|---|---|
| DE | 197 26 878 A1 | 10/1998 |
| DE | 197 33 896 A1 | 2/1999 |
| DE | 197 50 182 A1 | 5/1999 |
| DE | 299 14 924 U1 | 2/2000 |
| DE | 199 04 328 A1 | 8/2000 |
| EP | 0 867 346 A1 | 9/1998 |
| WO | WO 99/61288 | 12/1999 |
| WO | WO 01/14172 A1 | 3/2001 |

* cited by examiner

Primary Examiner—Paul N. Dickson
Assistant Examiner—Toan C To
(74) Attorney, Agent, or Firm—Laurence A. Greenberg; Werner H. Stemer; Manfred Beck (57) ABSTRACT

An airbag device includes a gas generator and an airbag to be accommodated behind at least one cover that can be displaced from a closed position, in which it is integrated into the vehicle's paneling, into an open position, in which it is disposed behind the paneling, when the airbag device is activated by driving devices. In the open position, the cover does not substantially project beyond the vehicle's paneling in the direction toward a passenger. The driving devices include at least one rolling piston that can be rolled in a guide chamber along a rolling path from a starting position into an end position when being subjected to compressed gas. The rolling piston thus causes the cover to move from the closed position to the open position. A method for operating an airbag device is also provided.

28 Claims, 5 Drawing Sheets

AIRBAG CONFIGURATION AND METHOD FOR OPERATING AN AIRBAG CONFIGURATION

CROSS-REFERENCE TO RELATED APPLICATION

This application is a continuation of copending International Application No. PCT/EP01/11085, filed Sep. 25, 2001, which designated the United States and was not published in English.

BACKGROUND OF THE INVENTION

1. Field of the Invention

The invention relates to an airbag configuration which includes a covering flap or covering device which can be pulled back. The invention further relates to an operating method for an airbag configuration of this type.

Published, Non-Prosecuted German Patent Application Nos. 197 26 878.1 and 197 33 896.8, European Patent Application No. EP 0 867 346 A1, and International Publication No. WO 99/61288, which have been filed for the inventor of the instant application, relate in general to an airbag configuration and a method for triggering an airbag configuration, wherein airbag covers can be pulled back.

Airbag flaps of this type or, in general, covering devices are pulled back into, for example, a module housing of the airbag configuration through the use of a separate mechanism before the airbag emerges from the dashboard behind which the airbag configuration is disposed. The purpose of airbag flaps which are pulled into the module has been comprehensively described by the present inventor, for example in European Patent Application No. EP 0 867 346 A1.

2. Summary of the Invention

It is accordingly an object of the invention to provide an improved airbag configuration and a method of operating an airbag configuration.

With the foregoing and other objects in view there is provided, in accordance with the invention, an airbag configuration, including:

a gas generator;

an airbag operatively connected to the gas generator;

a driving device operatively connected to the gas generator;

the driving device having a guide space formed therein, the guide space defining a rolling path with a starting position and an end position;

the driving device including a rolling piston, the rolling piston, when being subjected to compressed gas, rolling from the starting position to the end position along the rolling path;

a covering device for covering the airbag, the covering device being operatively connected to the driving device, the covering device being movable from a closed position to an open position, when the airbag configuration is triggered; and the rolling piston, when rolling from the starting position to the end position, moving the covering device from the closed position into the open position.

The basic idea of the invention is that the covering device or paneling is not removed by the airbag directly, but via auxiliary devices. The effect achieved thereby is that the airbag can emerge at lower pressure in a manner which is non-aggressive and therefore there is no risk of injury.

The present invention has the object of providing space-saving and simple constructional possibilities of an airbag configuration in accordance with, and with respect to, the abovementioned, earlier applications.

This object is achieved by the provision and the operation of advantageous mechanisms and drives for opening airbag flaps.

In particular, the present invention provides an airbag configuration having a gas generator and an airbag for accommodation behind at least one covering device which, when the airbag configuration is triggered, can be moved behind a vehicle paneling through the use of driving devices from a closed position integrated in the vehicle paneling, into an open position in such a manner that the at least one covering device does not at least substantially protrude over the vehicle paneling toward an occupant, the driving devices furthermore including at least one rolling piston which, by being subjected to compressed gas, can roll along a rolling path in a guide space from a starting position into an end position and in the process, if appropriate, carries along the covering device from the closed position into the open position.

According to a further feature of the invention, the guide space has a ring-like cross section or a cross section of part of a ring, and/or the rolling piston has a piston toothing for rolling along a surface, with a matching toothing within the guide space as it moves along the rolling path.

As an alternative or in addition, guide devices can be provided which are used, when the airbag configuration is triggered, to conduct compressed gas from the gas generator firstly into the guide space, in order to act upon the rolling piston, and only after the rolling piston has rolled at least from its starting position, preferably into a predetermined position, also to conduct the compressed gas into the airbag. The guide devices are preferably configured in such a manner that compressed gas is conducted from the gas generator into the airbag only when the rolling piston has reached its end position.

According to a further feature of the invention, the guide space is part of a gas generator housing and/or an airbag housing for accommodating the airbag.

Pulling devices are preferably provided which act at one end on the rolling piston, in the region of the axial ends thereof, and at the other end are connected to the covering device. In this case, provision can also be made for a receiving space or receptacle to be provided both for guiding the pulling devices away from the rolling piston toward the covering device and also for accommodating the covering device in its open position, and/or for the pulling devices to be led out of the guide space by using seals.

It is furthermore preferred if a gas chimney is provided for conducting compressed gas from the gas generator to the airbag, the guide space of the rolling piston preferably disposed between the gas generator and the gas chimney.

According to another feature of the invention, the gas generator housing and/or the airbag housing and/or the guide space and/or the receiving space and/or the gas chimney are formed at least substantially as an extruded profile or a plurality of extruded profiles, wherein preferably at least two of the above-mentioned components and, in particular, all of the abovementioned components are at least substantially integrally formed, i.e. at least substantially formed as a one-piece element. In this case, furthermore, each extruded profile can be closed at its axial ends by end plates.

According to yet another feature of the invention, a plurality of covering devices is provided, and the driving devices include a respective rolling piston for each of the covering devices. In this case, it is preferable to provide a separate guide space for each rolling piston.

According to a further feature of the invention, two covering devices and two corresponding rolling pistons, which are configured for moving in opposite directions, are provided.

The abovementioned embodiments of the invention can be further developed in combination with the configurations having guide devices such that the guide devices are configured in such a manner that only when each rolling piston which is provided has been moved at least from its starting position, preferably into a predetermined position, and particularly preferably into its end position, is compressed gas also conducted into the airbag.

According to yet a further feature of the invention, each covering device is preferably formed from an at least substantially dimensionally stable airbag cover.

With the objects of the invention in view there is also provided, a method for operating an airbag configuration, the method includes the steps of:

providing at least one covering device for a gas generator and an airbag such that the covering device is integrated in a vehicle paneling, when the at least one covering device is in a closed position;

providing a driving device having a rolling piston in a guide space in order to move the at least one covering device from the closed position into an open position when the airbag configuration is triggered;

subjecting the rolling piston to compressed gas in the guide space such that the rolling piston is rolled along a rolling path from a starting position into an end position and such that the rolling piston carries along the covering device from the closed position into the open position; and moving the covering device from the closed position into the open position such that the at least one covering device is moved behind the vehicle paneling and does at least not substantially protrude beyond the vehicle paneling toward an occupant.

In other words, the present invention also provides an operating method for an airbag configuration, wherein at least one covering device for covering a gas generator and an airbag is moved behind a vehicle paneling, when the airbag configuration is triggered, through the use of driving devices, from a closed position, which is integrated in a vehicle paneling, into an open position in such a manner that it does at least not substantially protrude beyond the vehicle paneling toward an occupant, and wherein a rolling piston is subjected to compressed gas in a guide space, so that it is rolled along a rolling path from a starting position into an end position and in the process carries along the covering device from a closed position into an open position.

This operating method for an airbag configuration can be further developed in that the rolling piston is acted upon by compressed gas from the gas generator, and in that compressed gas is only conducted into the airbag after the rolling piston has rolled at least from its starting position, preferably into a predetermined position, in particular into its end position, and/or in that a plurality of covering devices are moved, when the airbag device is triggered, from their closed positions into their open positions through the use of a corresponding number of rolling pistons. Preferably two covering devices are moved, when the airbag configuration is triggered, from their closed positions into their open positions through the use of two corresponding rolling pistons, which move in opposite directions when subjected to compressed gas, after the two rolling pistons have reached their end positions.

Whenever reference is made, in order to explain the invention, in the present document to a front passenger's airbag configuration which is configured as an airbag module having an airbag cover which can be pulled back, this is used only as an illustration by way of example. The invention is not restricted to applications in front passenger airbag configurations, but may also advantageously be used in airbag configurations other than front passenger airbag configurations.

In general, the invention provides an airbag configuration having at least one covering device behind which an airbag, which expands by filling with gas, is accommodated in a closed position, and which can be moved, in order to allow the airbag to spread out, from the closed position into an open position through the use of a controlling device, the controlling device containing a gas-generating device and mechanical devices as driving devices for moving the covering device from the closed position into the open position. The invention also provides a corresponding method for operating an airbag configuration.

Other features which are considered as characteristic for the invention are set forth in the appended claims.

Although the invention is illustrated and described herein as embodied in an airbag configuration and a method for operating an airbag configuration, it is nevertheless not intended to be limited to the details shown, since various modifications and structural changes may be made therein without departing from the spirit of the invention and within the scope and range of equivalents of the claims. In order to avoid mere repetition in the present document, reference is made to the abovementioned patent applications and also to International Publication No. WO 01/14172, which describe basic embodiments and constructional possibilities. The entire disclosure of these applications is hereby incorporated into the present application by reference.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The same reference numbers in the individual figures and diagrams of the drawings denote identical or similar or identically or similarly acting components. Features which are not provided with reference numbers are also clear with reference to the illustrations in the drawing, irrespective of whether such features are described in the following or are not. On the other hand, features which are included in the present description but cannot be seen or are not illustrated in the drawing are readily comprehensible to a person of skill in the art.

Individual features which are specified and/or illustrated in conjunction with specific exemplary embodiments are not restricted to these exemplary embodiments or a combination with the other features of these exemplary embodiments, but rather can be combined, within the scope of what is technically possible, with any other variants, even if they are not dealt with separately in the present document.

Figure 1:
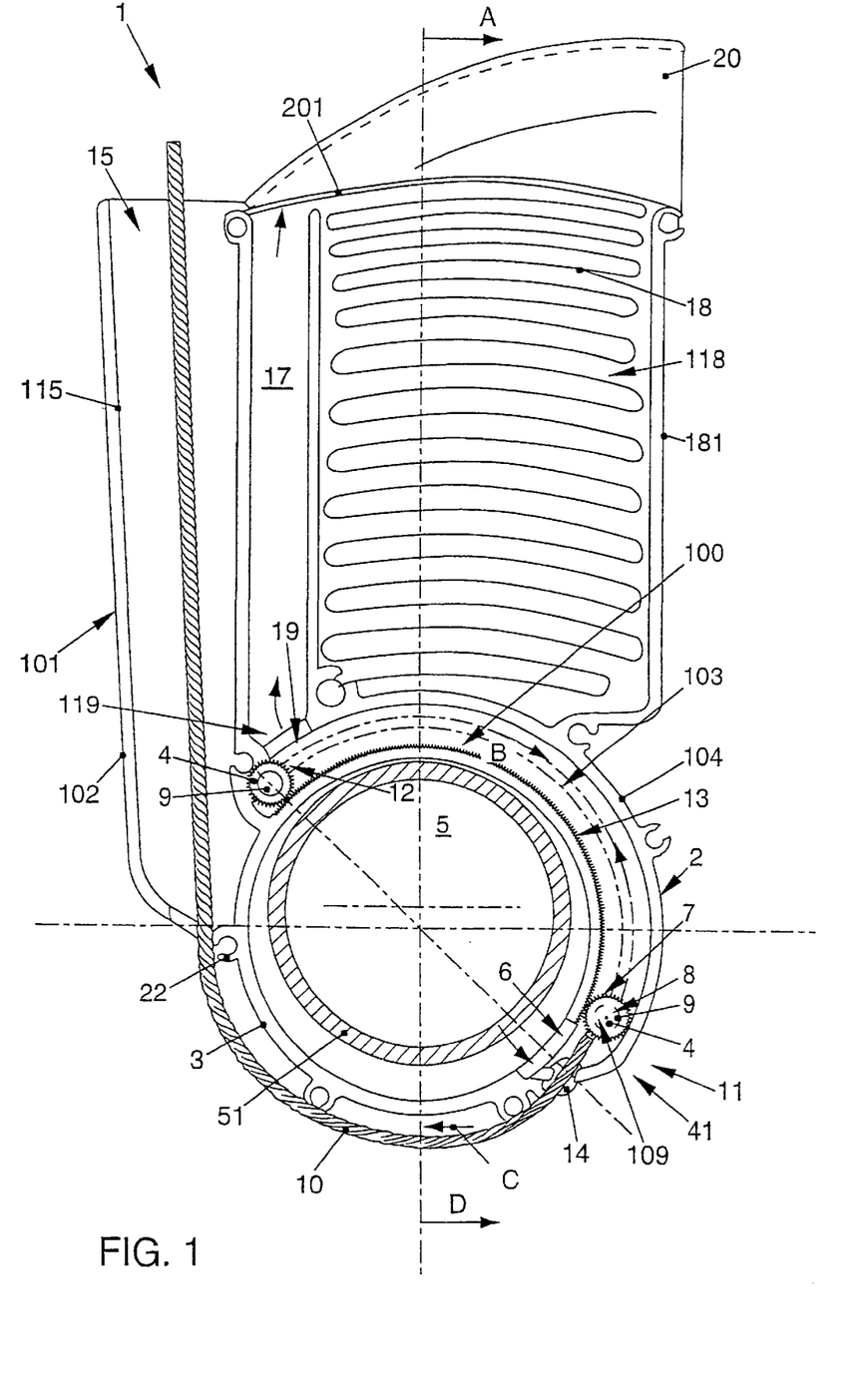
FIG. 1 is a diagrammatic longitudinal sectional view of a first exemplary embodiment of an airbag configuration according to the invention.

FIG. 1 shows an airbag configuration 1 in the form of an airbag module 101 which has a housing 102 which has essentially been produced from an "extruded profile" or extruded part 2 in a manner that is usual nowadays, inter alia, so that this manufacturing method and manner of construction as such is not discussed separately. In this constructional form, the airbag module 101 additionally contains a cylinder 3 and a partial cylinder 104 surrounding the latter, between which is formed a guide space 103 in which a rolling piston 4 moves as part of driving devices 41 for an airbag covering. In the partial ring-like guide space 103 between the cylinder 3 and the partial cylinder 104, the rolling piston 4 is subjected to pressure by the gas generator 5, when the latter is ignited, through the use of a gas passage 6, with the result that the gas generator 5, which is accommodated together with its housing 51 within the cylinder 3, is also part of the driving devices 41. However, a separate gas generator or another type of drive could also be used.

In the same manner as the entire module housing, the rolling piston 4 is formed of an extruded profile 8, which is produced in a rod-like manner, together with a piston toothing 7. When subjected to pressure, the extruded profile 8 of the rolling piston 4 rotates about an axis 109 which, at the ends of the rolling piston, extends through a respective bolt 9 to which pulling cables or in general terms pulling devices 10 are fastened as part of the driving devices 41. The rolling piston 4 is shown in FIG. 1 in the starting position 11 on the right-hand side (before the gas generator 5 is triggered) and in an end position 12 (at an end position of the path, for example at an end stop 34) on the left-hand side of FIG. 1. The rolling piston 4 rolls with the piston toothing 7 in parallel through the guide space 103, guided by the partial cylinder 104. In the region of the partial cylinder 104, a guide toothing 13, in which the toothing 7 of the rolling piston 4 engages, is provided on the outer side of the cylinder 3. The piston toothing 7 and the guide toothing 13 guarantee satisfactory, jamming-free running of the rolling piston 4, even if the attached pulling cables 10 require different amounts of power. The toothings 7 and 13 do not have to be provided over the entire length of the rolling piston 4, but rather also, for example, in two regions in each case on the outer side of the cylinder 3 along the rolling path 100 of the rolling piston 4 and, correspondingly, on the latter can ensure jamming-free guidance.

The pulling cables 10 are led out of the guide space 103 between the cylinder 3 and the partial cylinder 104 through the use of a seal 14, are conducted around the generator housing 51 and introduced into a cover pocket 115 as a receiving space or receptacle 15. The pulling cables 10 are connected there to the airbag cover or in general to an airbag covering.

The cover pocket 115 is part of the extruded profile 2 in the same manner as a gas chimney 17 which is alternatively integrated in this case on one side. The one-sided arrangement of the gas chimney 17 permits a simple arrangement of an airbag folding 118 of an airbag or gasbag 18 which is accommodated within an airbag housing 181 before the airbag configuration 1 is triggered. The gas chimney 17 is connected through the use of a gas passage 19 to the guide space 103 in a region thereof in the vicinity of the end position 12 of the rolling piston 4. The gas passage 19 opens into the guide space 103 in such a manner that only when the rolling piston 4 is rolled into its end position 12 is it possible that gas passes from the guide space 103 through the gas passage 19 into the airbag 18. This control in the form of guide devices 119 which contain the gas passage 19 and the configuration thereof within the guide space 103 with respect to the rolling path 100 is one of the basic concepts of the present invention and also, considered by itself, is capable of and worthy of being independently protected. A sliding ramp 20, in this case for an airbag cover, is integrated in the end walls 201.

The illustration of FIG. 1 relates to an airbag module 101 for an airbag cover which can be pulled back, in which all of the necessary constructional units are integrated in a cost-effective and space-saving manner in an extruded profile.

Figure 2:
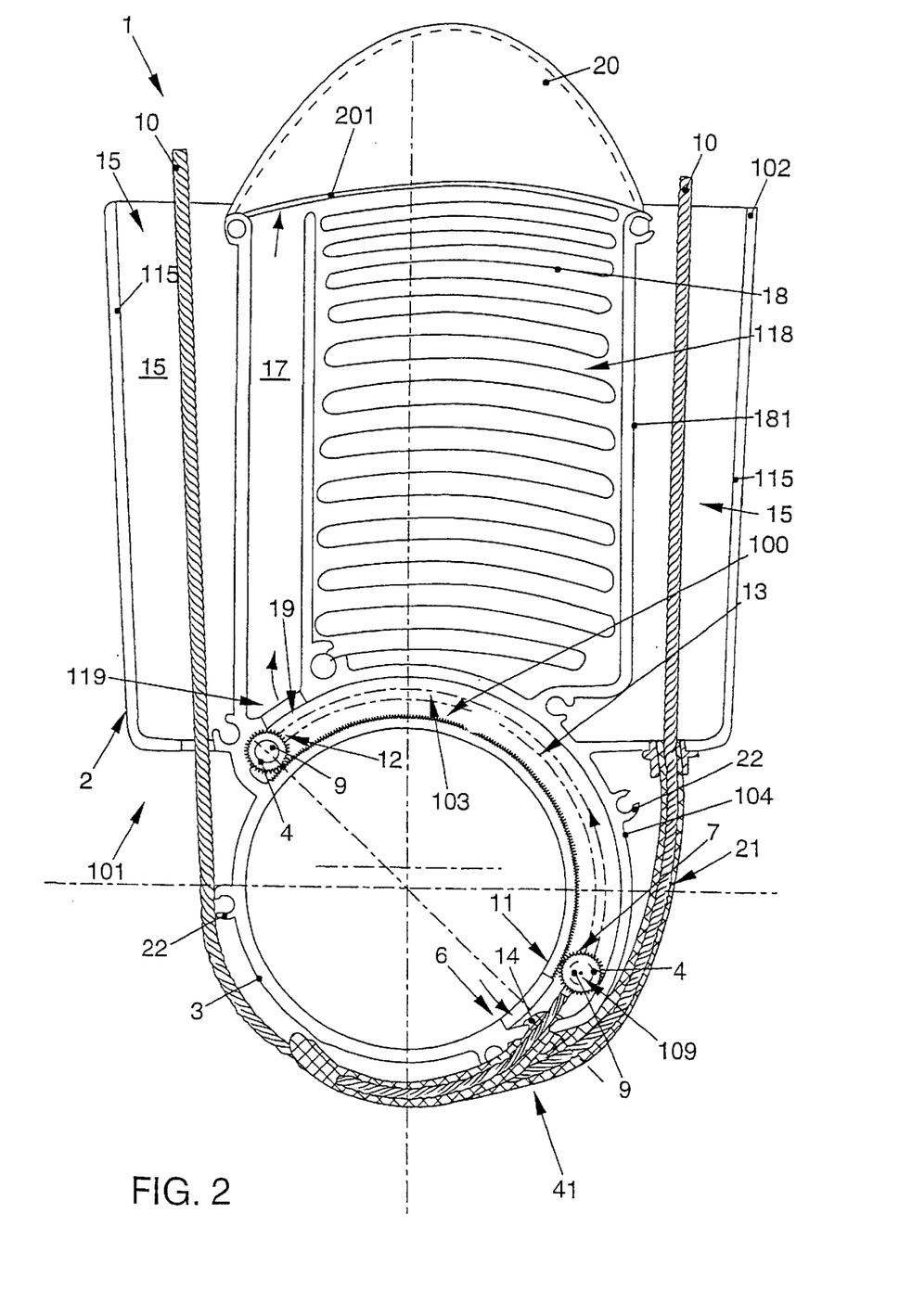
FIG. 2 is a diagrammatic longitudinal sectional view of a second exemplary embodiment of an airbag configuration according to the invention.

FIG. 2 shows the embodiment according to FIG. 1, but for retracting a double airbag flap. For this purpose, the sliding ramp 20 is configured in the manner shown in FIG. 2. Cover pockets 115 are provided on both sides of the airbag module 101 and, apart from the two pulling cables 10, two further pulling cables 10 are accommodated on the rolling piston 4, in each case in a Bowden cable 21.

The Bowden cables 21 are used for diverting two pulling cables 10 by 180° into one of the cover pockets 115.

Figure 3:
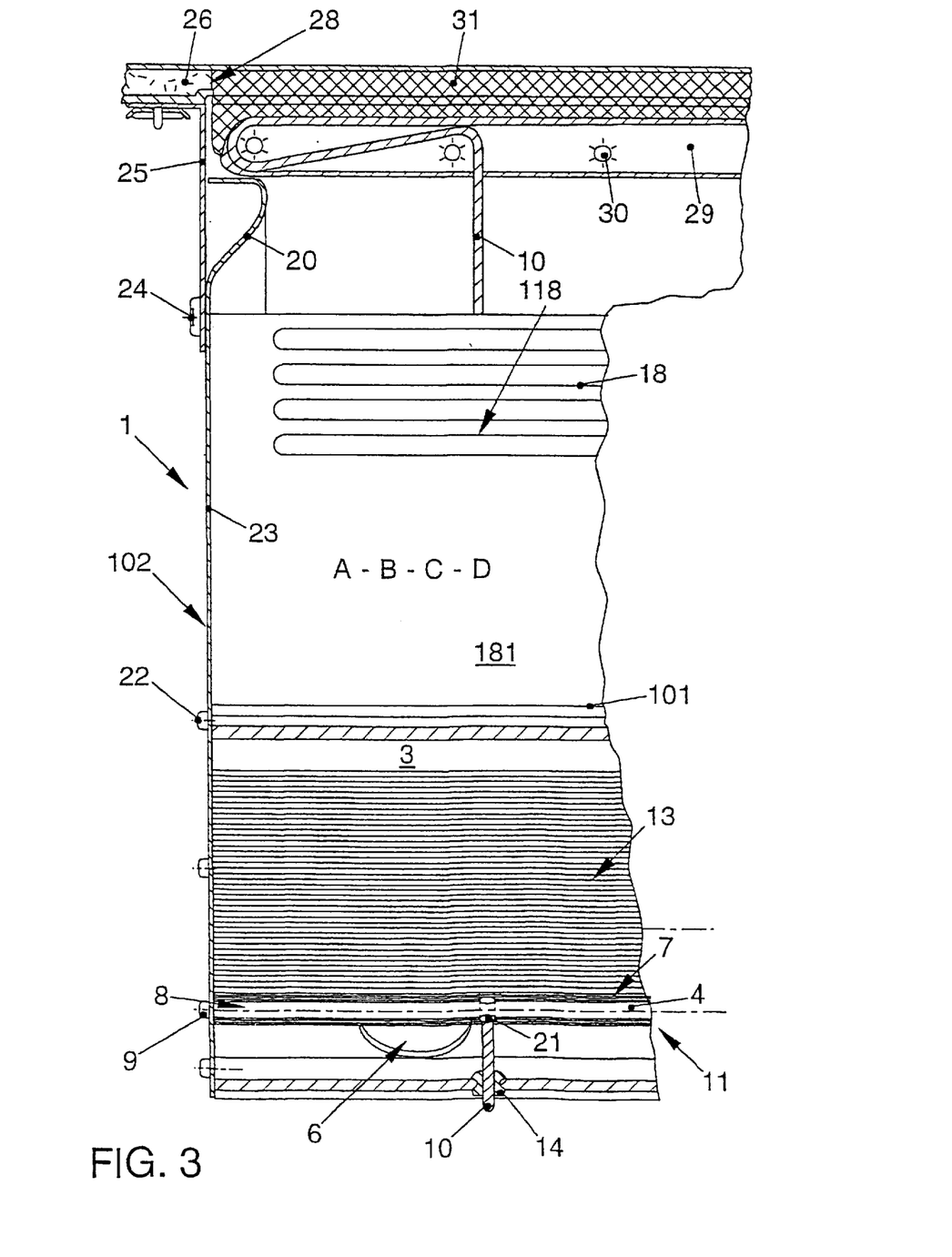
FIG. 3 is a diagrammatic partial longitudinal sectional view of an airbag configuration according to the section details A–B–C–D in FIG. 1.

FIG. 3 shows part of the section A–B–C–D from FIG. 1. Once again, in particular, the configuration of the "rolling piston" 4 is illustrated here. The pulling cables 10 are attached on the bolt 9 through the use of loops 21. The loops 21 are configured in a form-fitting manner all the way around in the same size as the rolling piston 4. A sealant, such as a rectangularly shaped, injection molded or inserted thermoplast may appropriately be used here in order to achieve a seal. The loops 21 of the pulling cables 10 are surrounded by segments of the rolling piston 4, which segments are to be attached to the bolt 9, in such a manner that the guide space 103 is filled in a form-fitting and sealed manner. The rolling pistons 4 are alternatively produced from an extruded profile or else from thermoplast, for example POM (polyolefin material). As an alternative, in the case of a soft thermoplast, a relatively large, elliptically compressed rolling piston 4 is also conceivable, as a result of which better sealing can be achieved depending on the application.

Furthermore, FIG. 3 shows a fastening 22 of end plates 23 and again the fastening 24 thereof to a supporting box 25 of a dashboard 26. The end plates or supporting plates 23 are provided with a sliding ramp 20.

FIG. 3 also shows the arrangement of incisions 28 in a fabric 29 of the pulling cables 10 and of a connecting plate 29 on the dashboard 26. The connecting plate 29 alternatively connects, as is shown in FIG. 3, the fabric 29 to the pulling cables 10 and is clinched in a folded manner, as indicated and shown at reference number 30.

Figure 4:
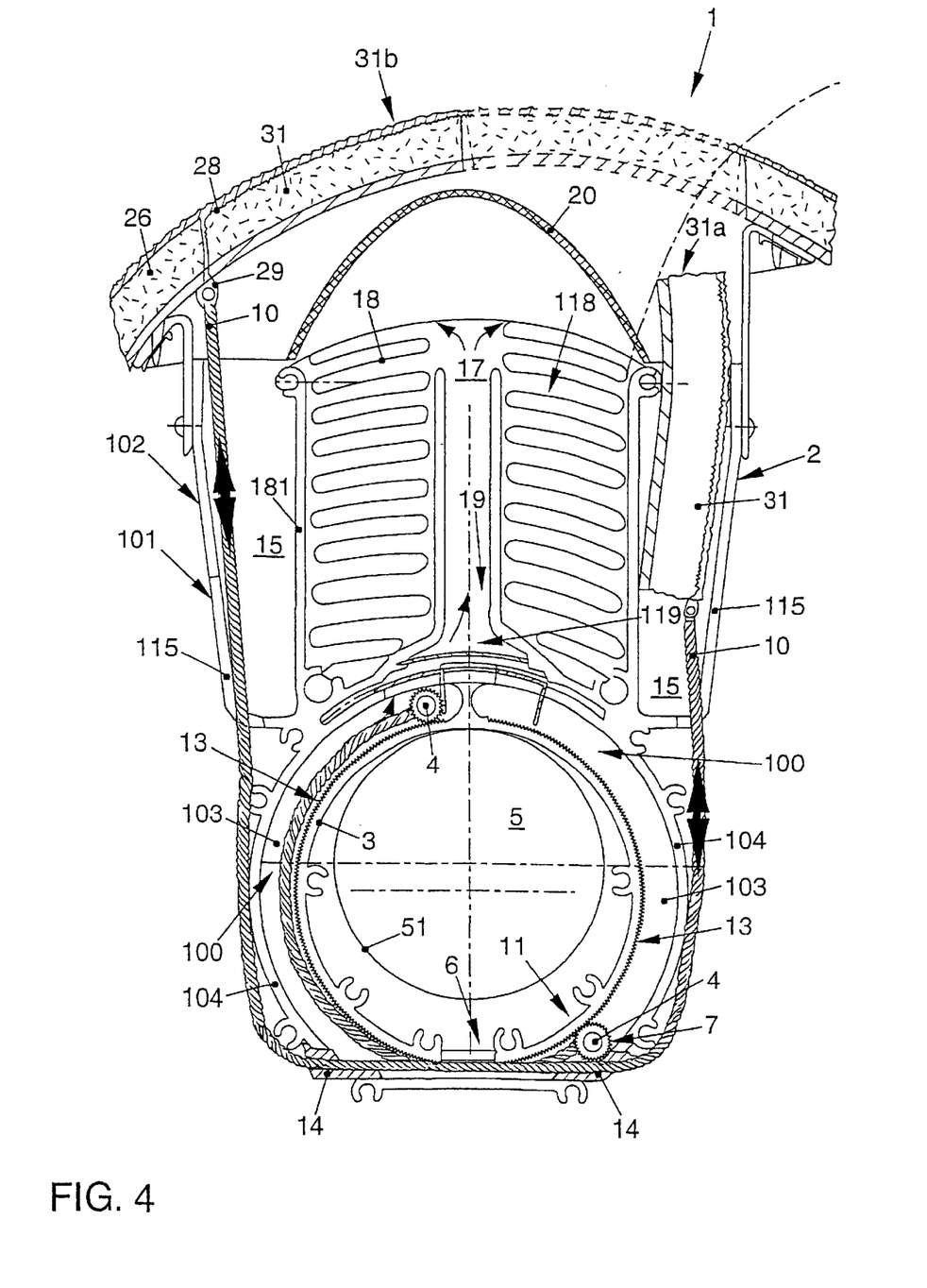
FIG. 4 is a diagrammatic longitudinal sectional view of a third exemplary embodiment of an airbag configuration according to the invention for illustrating the position of a rolling piston and of an airbag flap before and after the triggering of the airbag configuration.

FIG. 4 shows the previously described invention with rolling pistons 4 running "in opposite directions" on both sides of the generator housing 51.

The left side of FIG. 4 (rolling piston 4 to the left of the central axis together with the airbag flap or covering device 31 in an open position 31a on the right in the diagram) shows the end position 12 of the rolling piston 4, and the right side of FIG. 4 (rolling piston 4 to the right of the central axis together with the airbag flap or covering device 31 in a closed position 31b on the left in the figure) shows the starting position 11 of the rolling piston 4. This arrangement is also based on the concept that the rolling pistons 4 have first of all to pull airbag covers 31 into the cover pockets 115 before they open up the gas passage 19. The covering device 31 in its open position 31a is indicated with dashed lines.

Figure 5:
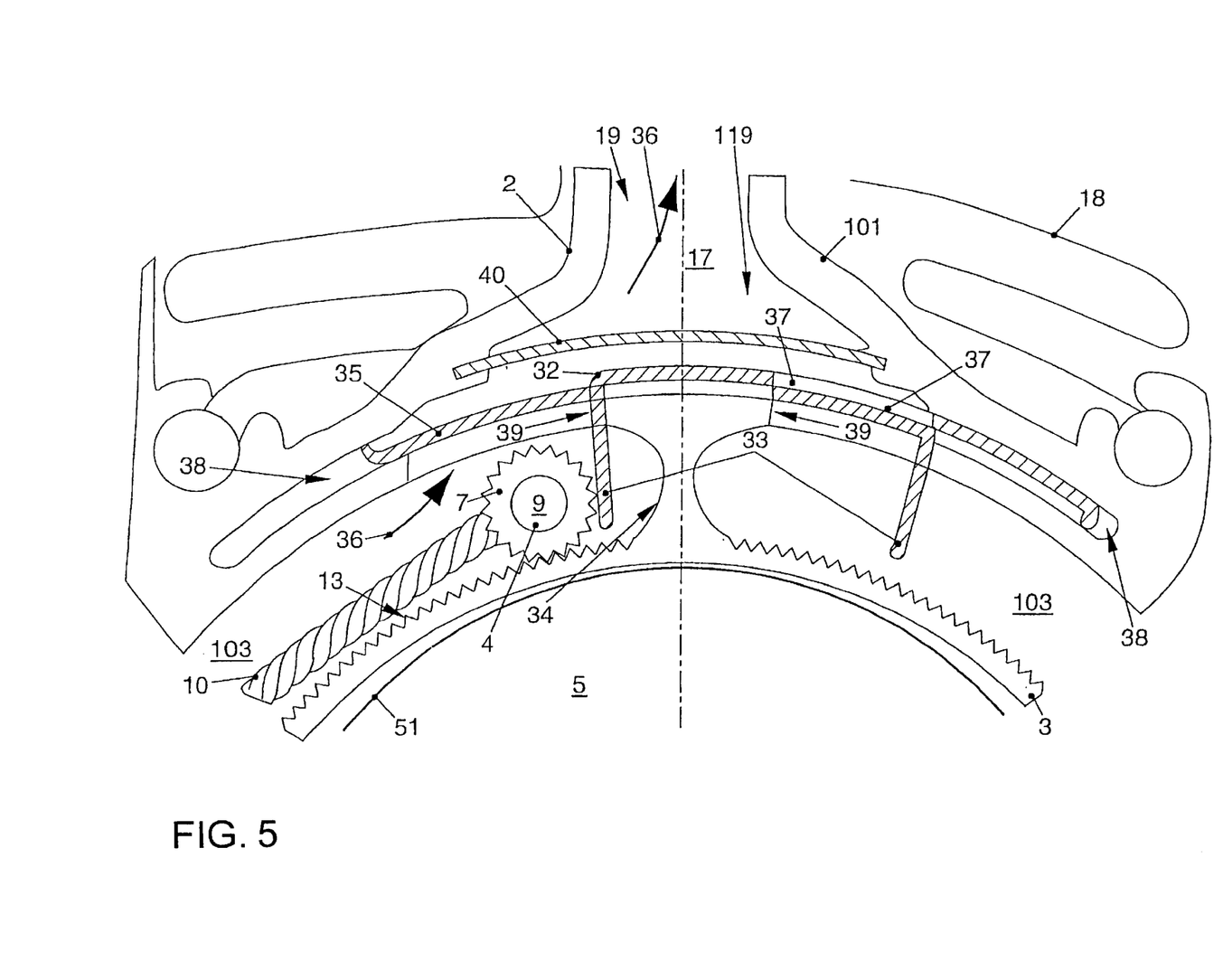
FIG. 5 is a diagrammatic sectional view of an enlarged detail of FIG. 4.

If a rolling piston 4 in practical use should open up the gas passage 19 before the second rolling piston 4 has pulled the airbag cover 31 connected to it into the associated cover pocket 115, the following measures, which are clarified in FIG. 5 which is an enlarged detail from FIG. 4, are advantageous.

FIG. 5 shows two slides 32 and 35 in detail on an enlarged scale. These slides 32 and 35 are in each case a plate having gas passage holes or respectively preventing the passage of gas, and are themselves part of the guide devices 119. FIG. 5 shows the manner in which the rolling piston 4 pushes the slide 32 via a driver 33 in such a manner that to the left and right of a stop 34 this slide 32 no longer lies in the way of a gas flow 36. Openings 37 are open. However, the gas flow 36 overall remains closed until the opposite slide 35 has also been pushed into the end position through the use of the rolling piston 4. The slides 32 and 35 move in slots 38 provided in the extruded profile 2. This is a so-called mechanical "AND" circuit. Only if the two slides 32 and 35 are in the end position, i.e. the airbag covers 31 are pulled into the respective cover pockets 115 or receiving spaces 15, is a gas passage 39 into the gas duct 17 or airbag 18 possible.

A further characteristic of the invention is the gas chimney 17, which is arranged in the center here, as part of the extruded profile 2. However, since the airbag must then lie around the gas chimney 17, the latter has to be milled off on the end side, and the hole produced has to be covered, for example with a covering plate 40 to be pushed into the extruded profile.

An advantage of the invention is the integration of all of the requirements of the airbag configuration 1 or of the airbag module 101 for retractable airbag covers into a single extruded profile in each case. The rolling pistons 4 permit rectilinear guidance of the pulling cable/pulling cables 10. Overall, space and cost advantages are achieved.

The invention is illustrated merely by way of example with reference to the exemplary embodiments in the description and in the drawings and is not restricted thereto, but includes all variations, modifications, substitutions and combinations which the expert can gather from the present documents, particularly within the scope of the claims and the general illustrations in the introduction to this description and from the description of the exemplary embodiments and the illustrations thereof in the drawing and can combine with his expert knowledge and with the prior art, in particular with incorporation of the entire disclosure of the earlier applications specified at the beginning of this description. In particular, all of the individual features and constructional possibilities of the invention and its exemplary embodiments can be combined.

I claim:

1. An airbag configuration, comprising:

a gas generator;

an airbag operatively connected to said gas generator;

a driving device operatively connected to said gas generator;

said driving device having a guide space formed therein, said guide space defining a rolling path with a starting position and an end position;

said driving device including a rolling piston, said rolling piston, when being subjected to compressed gas, rolling from said starting position to said end position along said rolling path;

a covering device for covering said airbag, said covering device being operatively connected to said driving device, said covering device being movable from a closed position to an open position, when the airbag configuration is triggered; and said rolling piston, when rolling from said starting position to said end position, moving said covering device from said closed position into said open position.

2. The airbag configuration according to claim 1, including:

a vehicle paneling connected to said covering device;

said covering device, when in said closed position, being integrated in said vehicle paneling such that said airbag is disposed behind said covering device; and said covering device being configured such that, when in said open position, said covering device does at least not substantially protrude beyond said vehicle paneling in a direction toward an occupant.

3. The airbag configuration according to claim 1, wherein said guide space has a cross-sectional shape selected from the group consisting of a ring and a partial ring.

4. The airbag configuration according to claim 1, wherein:

said guide space has a guide toothing; and said rolling piston has a piston toothing matching said guide toothing, said rolling piston rolls along said guide toothing in said guide space when moving along said rolling path.

5. The airbag configuration according to claim 1, including:

guide devices operatively connected to said guide space;

said guide devices, when the airbag configuration is triggered, conducting compressed gas from said gas generator firstly into said guide space in order to act upon said rolling piston; and said guide devices, when said rolling piston has been rolled at least from said starting position, also conducting compressed gas into said airbag.

6. The airbag configuration according to claim 1, including:

guide devices operatively connected to said guide space; and said guide devices, when the airbag configuration is triggered, conducting compressed gas from said gas generator firstly into said guide space in order to act upon said rolling piston; and said guide devices, when said rolling piston has been rolled from said starting position into a given position, also conducting compressed gas into said airbag.

7. The airbag configuration according to claim 5, wherein said guide devices are configured such that compressed gas is conducted from said gas generator into said airbag only when said rolling piston has reached said end position.

8. The airbag configuration according to claim 1, wherein:

said gas generator has a gas generator housing; and said guide space is formed as part of said gas generator housing.

9. The airbag configuration according to claim 1, including:
an airbag housing for accommodating said airbag; and
said guide space is formed as part of said airbag housing.

10. The airbag configuration according to claim 1, wherein:
said rolling piston has axial end regions; and
pulling devices are connected to said covering device and to said axial end regions of said rolling piston.

11. The airbag configuration according to claim 10, including:
a receptacle;
said receptacle being configured to guide said pulling devices from said rolling piston toward said covering device; and
said receptacle being configured to accommodate said covering device when said covering device is in said open position.

12. The airbag configuration according to claim 10, including:
seals disposed at said guide space; and
said pulling devices being led out of said guide space via said seals.

13. The airbag configuration according to claim 1, including a gas chimney operatively connected to said gas generator for conducting compressed gas from said gas generator to said airbag.

14. The airbag configuration according to claim 13, wherein said guide space for said rolling piston is disposed between said gas generator and said gas chimney.

15. The airbag configuration according to claim 13, including:
an airbag housing for accommodating said airbag;
said gas generator having a gas generator housing;
a receptacle configured to accommodate said covering device when said covering device is in said open position; and
at least one element selected from the group consisting of said gas generator housing, said airbag housing, said guide space, said receptacle and said gas chimney being an extruded part.

16. The airbag configuration according to claim 15, wherein at least two elements selected from the group consisting of said gas generator housing, said airbag housing, said guide space, said receptacle and said gas chimney are substantially formed as a single piece.

17. The airbag configuration according to claim 15, including:
end plates; and
said extruded part having axial ends, said end plates closing said extruded part at said axial ends.

18. The airbag configuration according to claim 1, including:
a further covering device for covering said airbag, said further covering device being movable from a closed position to an open position, when the airbag configuration is triggered; and
said driving device including a further rolling piston, said further rolling piston, when rolling from a starting position to an end position, moving said further covering device from said closed position into said open position.

19. The airbag configuration according to claim 18, wherein said driving device has a further guide space formed therein, said further guide space defines a rolling path for said further rolling piston.

20. The airbag configuration according to claim 18, wherein said rolling piston and said further rolling piston move in respective directions opposite from one another.

21. The airbag configuration according to claim 19, including:
guide devices operatively connected to said guide space and said further guide space; and
said guide devices, when the airbag configuration is triggered, conducting compressed gas from said gas generator into said guide space and into said further guide space in order to act upon said rolling piston and said further rolling piston, and said guide devices being configured such that, only after said rolling piston and said further rolling piston have been rolled from respective starting positions to respective given positions, said guide devices also conduct compressed gas into said airbag.

22. The airbag configuration according to claim 21, wherein said guide devices are configured such that, only after said rolling piston and said further rolling piston have been rolled from respective starting positions to respective end positions, said guide devices also conduct compressed gas into said airbag.

23. The airbag configuration according to claim 1, wherein said covering device is an at least substantially dimensionally stable airbag cover.

24. A method for operating an airbag configuration, the method which comprises:
providing at least one covering device for a gas generator and an airbag such that the at least one covering device is integrated in a vehicle paneling, when the at least one covering device is in a closed position;
providing a driving device having a rolling piston in a guide space in order to move the at least one covering device from the closed position into an open position when the airbag configuration is triggered;
subjecting the rolling piston to compressed gas in the guide space such that the rolling piston is rolled along a rolling path from a starting position into an end position and such that the rolling piston carries along the at least one covering device from the closed position into the open position; and
moving the at least one covering device from the closed position into the open position such that the at least one covering device is moved behind the vehicle paneling and does at least not substantially protrude beyond the vehicle paneling toward an occupant.

25. The method according to claim 24, which comprises conducting compressed gas from the gas generator into the airbag only after the rolling piston has rolled from the starting position into a given position.

26. The method according to claim 24, which comprises conducting compressed gas from the gas generator into the airbag only after the rolling piston has rolled from the starting position into the end position.

27. The method according to claim 24, which comprises moving a plurality of covering devices when the airbag configuration is triggered, from respective closed positions into respective open positions by using a corresponding number of rolling pistons.

28. The method according to claim 24, which comprises subjecting two rolling pistons with compressed gas such that the two rolling pistons move in opposite directions in order to move two covering devices from respective closed positions into respective open positions when the two rolling pistons have reached respective end positions.

* * * * *